United States Patent [19]

McCartney et al.

[11] 4,374,186
[45] Feb. 15, 1983

[54] POLYMER PACKAGED CELL IN A SACK

[75] Inventors: Joseph F. McCartney, Solana Beach; Thomas E. Jones, Spring Valley; Leopold J. Johnson, Valley Center, all of Calif.

[73] Assignee: The United States of America as represented by the Secretary of the Navy, Washington, D.C.

[21] Appl. No.: 258,838

[22] Filed: Apr. 29, 1981

[51] Int. Cl.³ .............................................. H01M 6/46
[52] U.S. Cl. .................................... 429/154; 429/157; 429/162; 429/194
[58] Field of Search .............................. 429/152–162, 429/194

[56] References Cited

U.S. PATENT DOCUMENTS

| | | | |
|---|---|---|---|
| 2,995,614 | 8/1961 | Krueger | 429/158 |
| 3,353,999 | 11/1967 | Osborn | 429/156 X |
| 3,390,014 | 6/1968 | Eisler | 429/154 X |
| 4,070,528 | 1/1978 | Bergum et al. | 429/152 |
| 4,091,188 | 5/1978 | Dey | 429/194 X |
| 4,169,920 | 10/1979 | Epstein | 429/154 |

Primary Examiner—Charles F. LeFevour
Attorney, Agent, or Firm—Robert F. Beers; Ervin F. Johnston; Harvey Fendelman

[57] ABSTRACT

A battery cell and battery are disclosed in which a cathode layer and an anode layer are separated by a nonconducting ion permeable membrane and are sandwiched between a pair of conducting polymer layers. The conducting polymer layers and the ion permeable membrane from two distinct compartments in which the cathode and anode of the cell, respectively are positioned. A liquid electrolyte is sealed in each compartment. The ion permeable membrane allows passage through it of selected ions.

15 Claims, 2 Drawing Figures

POLYMER PACKAGED CELL IN A SACK

BACKGROUND OF THE INVENTION

The present invention relates generally to the field of battery cells and batteries and, more specifically, to thin electrode batteries.

The present commonly used methods of producing electrochemical battery cells is to fabricate anodes and cathodes as separate, self-supporting elements within the cell. The anode and cathode are electrically isolated from each other with a porous separator. Each electrode usually has a low resistance current collector and bus lead required to make the battery energy available to a load with a minimum of internal battery losses. In addition to the working elements of the battery cell an envelope package must be supplied to contain the liquid electrolyte and the anode, cathode, separator and current collectors.

A severe limitation to the normal construction of the battery cell is the porosity of the separator. The separator needs to be porous in order to allow unrestricted ion flow through the electrolyte. This needed porosity, however, also allows the formation and growth of dendrites of conducting metal to bridge between the anode and cathode. If a dendrite formation completes a bridge, the cell becomes short circuited and this destroys the useful capacity of the cell. Conventional battery cells also suffer from the shortcoming that they require a separate package for enclosing the cell, which package is usually nonfunctional with respect to the generation of current.

SUMMARY OF THE INVENTION

The present invention overcomes the foregoing disadvantages of prior art battery cells by providing a flexible, low cost bipolar battery cell which is self-contained and needs no additional container or package. Additionally, the present invention provides an easy means of series connecting multiple cell batteries without the need for cell-to-cell interconnect buses or leads. Further, the present invention provides an improved battery cell which is designed so as to prevent the growth of dendrites.

The foregoing advantages are accomplished by the use of ion permeable insulating membrane sandwiched between two sheets of conductive polymer so as to form two separate compartments. The ion permeable insulating membrane is an insulating plastic type material which can seal a liquid electrolyte but will permit the passage of selected ions through it with low flow impedance. The conductive polymer layers are comprised of good electrically conductive material that does not pass ions and also is a good liquid electrolyte seal. Additionally, it is often desirable to utilize a conductive polymer which may be highly conductive at low temperatures and is also highly resistive at elevated temperatures thereby limiting thermal runaway upon short circuit loading. The cathode and anode are positioned, respectively within the two compartments formed by the two sheets of conductive polymer and the ion permeable insulating membrane which is sandwiched between the two sheets of polymer. The liquid electrolyte filling the two compartments is thoroughly sealed within each compartment and does not pass through the ion permeable membrane so as to prevent the formation of unwanted dendrites.

The conducting polymer thus acts not only as a container for the battery cell but also as the outer terminals of the cell. Further, by the present design very large electrode surface areas may be utilized in order to achieve high rate capabilities from the battery. Electrodes with low current densities are thus useable to form a battery which has a resultant high rate capability. Moreover, since conductive polymer material is used as the external terminals of the cell, the problem of extremely high weight battery terminals and electrode surfaces is overcome. The present invention therefore provides a simple, easy battery package construction. The battery cells according to the present invention may include self limiting protection by means of a conducting polymer positive temperature coefficient or resistance. Equally important, absolute protection against dendritic short circuit is provided in accordance with the present invention.

OBJECTS OF THE INVENTION

Accordingly, it is the primary object of the present invention to disclose a flexible, low cost bipolar rechargeable battery cell which is self-contained and needs no additional container or package.

It is a further object of the present invention to disclose a battery cell that inherently provides an easy means of series connecting multiple cell batteries without the need for added cell-to-cell interconnect buses or leads.

A concomitant object of the present invention is to disclose a battery cell that provides absolute protection against dendritic short circuit.

Other objects, advantages and novel features of the invention will become apparent from the following detailed description of the invention when considered in conjunction with the accompanying drawings.

DESCRIPTION OF THE PREFERRED EMBODIMENT

Figure 1:
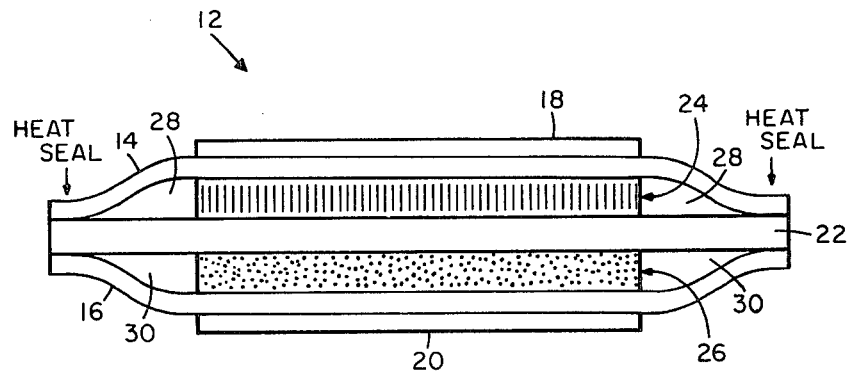
FIG. 1 is a cross-sectional side view of the battery cell of the present invention.

Referring now to FIG. 1 there is illustrated a battery cell constructed in accordance with the present invention. The battery cell 12 is comprised of two layers 14 and 16 of electrically conductive polymer. Preferably, the conductive polymer 14 and 16 is comprised of graphite filled polyethylene or, alternatively, graphite filled Teflon or graphite filled polypropylene may be used. The layers 14 and 16 of electrically conductive polymer act as a container for the electrochemical cell 12 including the electrolyte solution and also serve as electrical conductors between the contacting metallic electrodes 18 and 20 within the cell and the adjacent cell. The metallic terminals 18 and 20 are provided to efficiently carry the electrical current from the battery cell 12 to external electrical load.

Sandwiched between the electrically conductive polymer layers 14 and 16 is a dimensionally stable ion permeable membrane 22. The membrane 22 acts as an electrical separator (insulator) between the cathode 24 and the anode 26 and in addition, serves as an ion porous material to allow the passage of chemical ions. The ion permeable insulating membrane 22 prevents the growth of metallic dendrites between the anode 26 and cathode 24 and also acts as an electrolyte reservoir.

As is seen in FIG. 1 the conducting polymer 14 is fused as by heat sealing to the ion permeable insulating membrane 22 and, likewise, the ion permeable insulating membrane 22 is fused to the electrically conductive polymer 16. This construction results in a first compartment 28 formed by the electrically conductive polymer 14 and the insulating membrane 22 and a second compartment 30 formed by the electrically conductive polymer 16 and the ion permeable insulating membrane 22. An electrolytic solution is contained within each of the compartments 28 and 30 and preferably is comprised of an organic solvent ionizing salt which may be made by dissolving lithium hexafluoraarsenate in a solution of 2 methyl tetrahydrofuran. The electrolytic solution contained within each of the compartments 28 and 30 is thus completely sealed within its respective compartment. Moreover, the cathode 24 is completely sealed in a separate compartment from the anode 26.

The cathode 24 which may be comprised of a mixture of carbon and vanadium oxide acts as an electrical current exchange medium between the electrolyte and external circuit as well as a support for the compounds undergoing a valence change in the electrochemical cell. The anode 26 which may be comprised of lithium or another material such as zinc supplies positive ions to the electrolyte within its compartments 30 and also supplies electrons to the external circuit.

The battery cell design in accordance with the present invention prevents the growth of metal dendrites by use of the ion permeable membrane 22 which allows ions to pass through but will not allow the bulk passage of liquid electrolyte. The conducting polymer layers 14 and 16 serve as part of the cell container, the interconnecting electrode, and provide control for prevention of thermal runaway upon battery short circuit loading. The conducting polymer layers 14 and 16 which are fused to the ion permeable membrane at the outer periphery of those layers, totally encloses each cell and safely contains the electrolyte in the battery. Thus, single cell batteries can be made as a "cell in a sack" type of construction in accordance with the present invention.

Figure 2:
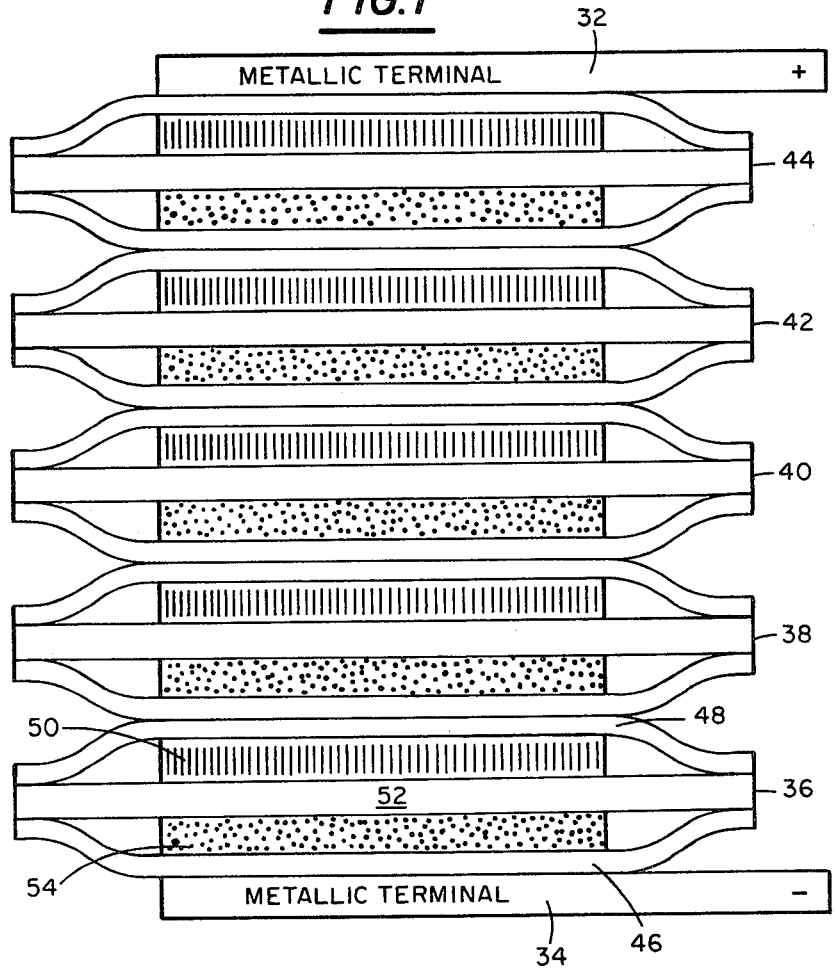
FIG. 2 is a cross-sectional side view of a series connection of multiple cell battery in accordance with the present invention.

Referring to FIG. 2 there is an illustration of a series connection of the battery cells previously described with reference to FIG. 1. Referring to FIG. 2 it is seen that five of the types of cells illustrated in FIG. 1 are connected in series between metallic terminals 32 and 34. Each of these cells 36, 38, 40, 42 are comprised of outer electrically conductive polymer layers 46 and 48 (illustrated for purposes of simplicity with respect to cell 36 only), cathode 50, ion permeable membrane 52 and anode 54.

Obviously many modifications and variations of the present invention are possible in the light of the above teachings. It is therefore to be understood that within the scope of the appended claims the invention may be practiced otherwise than as specifically described.

What is claimed is:
1. A battery cell comprising:
a first layer of conductive polymer;
a layer of cathode material disposed in contact with said first layer of conductive polymer;
a layer of ion permeable, electrolyte impermeable insulating material disposed in contact with said layer of cathode material and in contact with said layer of conductive polymer so as to form a complete enclosure around said layer of cathode material;
a layer of anode material disposed in contact with said layer of ion permeable insulating material; and
a second layer of conductive polymer disposed in contact with said layer of anode material and in contact with said layer of ion permeable insulating material so as to form a complete enclosure around said layer of anode material.
2. The battery cell of claim 1 further comprising:
a first metallic conductor disposed in contact with said first layer of conductive material; and
a second metallic conductor disposed in contact with said second layer of conductive polymer.
3. The battery cell of claims 1 or 2 wherein:
said first and second layers of conductive polymer comprise electrically conductive polypropylene.
4. The battery cell of claims 1 or 2 wherein:
said first and second layers of conductive polymer comprise graphite filled polyethylene.
5. The battery cell of claims 1 or 2 wherein:
said first and second layers of conductive polymer comprise polyletrafluoroethylene.
6. The battery cell of claims 1 or 2 wherein:
said layer of ion permeable insulating material comprises a solid polymer lithium-ion permeable insulating membrane.
7. The battery cell of claim 6 wherein said anode material comprises lithium.
8. The battery cell of claim 7 wherein:
said cathode material comprises vanadium oxide.
9. The battery cell of claim 8 wherein:
said ion porous material comprises a radiation grafted polyethylene film.
10. The battery cell of claim 1 wherein said
first and second layer of conductive polymer comprise a blown film of polyethylene containing carbon.
11. The battery cell of claims 1 or 2 further comprising:
a liquid electrolyte contained in each of said complete enclosures around said layer of cathode material and around said layer of anode material.
12. The battery cell of claim 11 wherein said liquid electrolyte comprises an organic solvent and an ionizing salt.
13. A plurality of battery cells as claimed in claims 1 or 2, said plurality of cells being connected in series.
14. A battery cell comprising:
first and second layers of conductive polymer material;
a layer of ion permeable, electrolyte impermeable material sandwiched between said first and second layers of conductive polymer material and sealed at the periphery thereof to said first and second layers of conductive polymer material such that a first complete enclosure is formed by said layer of ion permeable material with said first layer of conductive polymer material and such that a second complete enclosure is formed by said layer of ion permeable material with said second layer of conductive polymer material;
a layer of cathode material disposed in said first complete enclosure in contact with said first layer of conductive polymer and in contact with said layer of ion permeable material; and
a layer of anode material disposed in said second complete enclosure in contact with said second layer of conductive polymer and in contact with said layer of ion permeable material.
15. The battery cell of claim 14 further comprising:
an electrolytic solution contained within each of said first and second complete enclosures.